US011183172B2

(12) United States Patent
Kandade Rajan

(10) Patent No.: US 11,183,172 B2
(45) Date of Patent: Nov. 23, 2021

(54) DETECTION OF FRICATIVES IN SPEECH SIGNALS

(71) Applicant: Harman Becker Automotive Systems GmbH, Karlsbad (DE)

(72) Inventor: Vasudev Kandade Rajan, Straubing (DE)

(73) Assignee: Harman Becker Automotive Systems GmbH (DE)

( * ) Notice: Subject to any disclaimer, the term of this patent is extended or adjusted under 35 U.S.C. 154(b) by 38 days.

(21) Appl. No.: 16/743,225

(22) Filed: Jan. 15, 2020

(65) Prior Publication Data

US 2020/0251090 A1 Aug. 6, 2020

(30) Foreign Application Priority Data

Jan. 31, 2019 (DE) ......................... 102019102414.5

(51) Int. Cl.
*G10L 15/02* (2006.01)
*G10L 15/065* (2013.01)
*G10L 21/0208* (2013.01)
*G10L 15/10* (2006.01)

(52) U.S. Cl.
CPC ............ *G10L 15/02* (2013.01); *G10L 15/065* (2013.01); *G10L 15/10* (2013.01); *G10L 21/0208* (2013.01); *G10L 2015/025* (2013.01); *G10L 2021/02082* (2013.01)

(58) Field of Classification Search
None
See application file for complete search history.

(56) References Cited

U.S. PATENT DOCUMENTS

| 3,679,830 A | 7/1972 | Uffelman et al. |
| 3,846,586 A | 11/1974 | Griggs |
| 4,630,300 A | 12/1986 | Kang |
| 5,583,696 A | 12/1996 | Takahashi |
| 2003/0033139 A1* | 2/2003 | Walker ............... G10L 21/0208 704/210 |

(Continued)

OTHER PUBLICATIONS

Abdelatty Ali, Ahmed M., Jan Van der Spiegel, and Paul Mueller. "Acoustic-phonetic features for the automatic classification of fricatives." The Journal of the Acoustical Society of America 109.5 (2001): 2217-2235. (Year: 2001).*

*Primary Examiner* — Douglas Godbold
(74) *Attorney, Agent, or Firm* — Angela M. Brunetti

(57) ABSTRACT

Detecting fricatives in a noisy speech signal having a clean speech signal and a noise signal, includes bandpass filtering of the noisy speech signal with a first transfer function having a first passband range to provide a first filtered noisy speech signal, and bandpass filtering of the noisy speech signal with a second transfer function having a second passband range, the second passband being different from the first passband to provide a second filtered noisy speech signal. Detecting fricatives further includes applying a maximum operation to the first filtered noisy speech signal and the second filtered noisy speech signal to provide a maximum spectrum that is representative of a frequency range of maximum fricative energy, and deciding, based on the maximum spectrum, whether a fricative is contained in the noisy speech signal. A decision signal is output that is representative of the decision.

12 Claims, 3 Drawing Sheets

(56) References Cited

U.S. PATENT DOCUMENTS

| | | | |
|---|---|---|---|
| 2011/0178799 A1* | 7/2011 | Allen | G10L 21/0364 704/226 |
| 2012/0150544 A1* | 6/2012 | McLoughlin | G10L 21/0364 704/262 |
| 2014/0316778 A1* | 10/2014 | Venkatesha | G10L 21/0208 704/233 |
| 2015/0112689 A1* | 4/2015 | Nandy | G10L 15/20 704/270 |
| 2019/0206420 A1* | 7/2019 | Kandade Rajan | G10L 21/0224 |

* cited by examiner

DETECTION OF FRICATIVES IN SPEECH SIGNALS

CROSS REFERENCE

Priority is claimed to application serial no. 102019102414.5, filed Jan. 31, 2019 in Germany, the disclosure of which is incorporated in its entirety by reference.

BACKGROUND

1. Technical Field

The disclosure relates to a method and system (generally referred to as a "method") for the detection of fricatives in speech signals.

2. Related Art

Speech contains different articulations such as vowels, fricatives, nasals, etc. These articulations and other properties such as short-term power, can be exploited to assist speech signal enhancement in systems such as noise reduction systems and speech recognition systems. A detector referred to as voice activity detector (VAD) is commonly used in such systems. The voice activity detector generates a detection signal which, when binary, assumes 0 or 1 to indicate the presence or absence of speech or vice versa. The detection signal may further assume values between 0 and 1 to allow a soft decision which can indicate a certain measure or a certain probability for the presence of the speech in the signal. The detection signal may be applied, for example, to various stages of a speech enhancement system such as echo cancellers, beamformers, noise estimators, noise reduction stages, etc.

A fricative sound can be defined as a "voiceless" part of a speech syllable which is produced when pressing air through the teeth and the lips. Sounds such as /s/ in the word "stop", /sh/ in the word "shop", /f/ in the word "four" are examples of fricatives. Most languages in the world contain fricative sounds in their spoken speech. Detections of such sounds are challenging since technically they resemble a broadband shaped noise. If correctly detected, however, fricatives can help to identify most of the speech present in signals and can supplement normal voice activity detectors. Thus, there is a desire to improve the detection of fricatives.

SUMMARY

A method for detecting fricatives in a noisy speech signal, which contains a clean speech signal and a noise signal, includes bandpass filtering of the noisy speech signal with a first transfer function having a first passband range to provide a first filtered noisy speech signal, and bandpass filtering of the noisy speech signal with a second transfer function having a second passband range, the second passband being different from the first passband to provide a second filtered noisy speech signal. The method further includes applying a maximum operation to the first filtered noisy speech signal and the second filtered noisy speech signal to provide a maximum spectrum that is representative of a frequency range of maximum fricative energy, and deciding, based on the maximum spectrum, whether a fricative is contained in the noisy speech signal and providing a decision signal representative of the decision.

A system for detecting fricatives in a noisy speech signal, which contains a clean speech signal and a noise signal, includes at least one processing unit connected to an input and an output, and is configured to bandpass filter the noisy speech signal with a first transfer function having a first passband range to provide a first filtered noisy speech signal, and to bandpass filter the noisy speech signal with a second transfer function having a second passband range, the second passband being different from the first passband to provide a second filtered noisy speech signal. The at least one processing unit further configured to apply a maximum operation to the first filtered noisy speech signal and the second filtered noisy speech signal to provide a maximum spectrum that is representative of a frequency range of maximum fricative energy, and to decide, based on the maximum spectrum, whether a fricative is contained in the noisy speech signal and providing a decision signal representative of the decision.

Other systems, methods, features and advantages will be, or will become, apparent to one with skill in the art upon examination of the following detailed description and appended figures. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
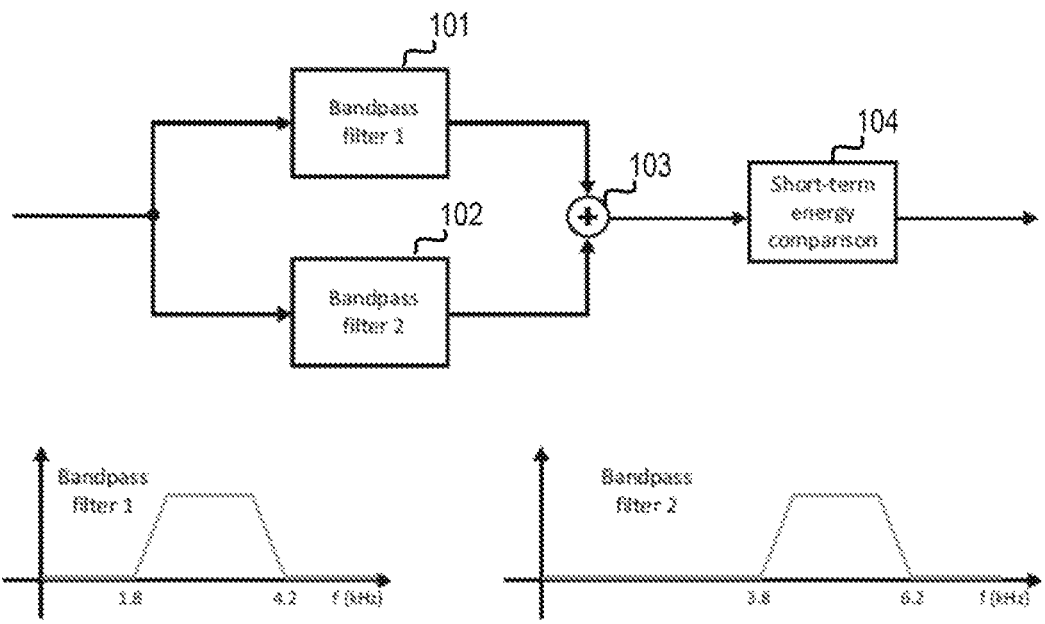
FIG. 1 is a block illustrating a signal flow structure of an exemplary common fricative detection system.

For clean speech, which means speech without accompanying unwanted noise, fricatives can be detected rather reliably. Analysis of speech signals and articulations have shown that fricatives mainly involve two frequency ranges, one between 2 kHz and 4 kHz and the other between 4 kHz and 6 kHz. For example, monitoring these frequency ranges with two bandpass filters at the same time in view of a short-term increase in the energy of a speech signal allows for reliably concluding whether the speech segment under investigation is a fricative or not. An implementation of such a system is shown in FIG. 1. Signals in the frequency and sub-band domain are herein also referred to as spectra or spectral signals. After simultaneous bandpass filtering of a clean speech signal with two bandpass filtering procedures 101 and 102, two filtered spectra $S_{b1}(\mu, k)$ and $S_{b2}(\mu, k)$ derived in this manner are combined, e.g., by a summing procedure 103. The two filtered spectra $S_{b1}(\mu, k)$ and $S_{b2}(\mu, k)$ in the sub-band domain arise from a spectrum $S(\mu, k)$ of the clean speech signal after filtering (in the frequency or sub-band domain: multiplying) with a respective transfer function $H_{bp1}(\mu, k)$ and $H_{bp2}(\mu, k)$ of the two bandpass filtering procedures 101 and 102 according to:

$$S_{b1}(\mu,k)=S(\mu,k)\cdot H_{bp1}(\mu,k), \qquad (1)$$

$$S_{b2}(\mu,k)=S(\mu,k)\cdot H_{bp2}(\mu,k), \qquad (2)$$

wherein a respective sub-band is denoted by $\mu$ and a respective (time) frame is denoted by k. The transfer function $H_{bp1}(\mu, k)$ may include a passband between 2 kHz and 4 kHz and the transfer function $H_{bp2}(\mu, k)$ may include a passband between 4 kHz and 6 kHz as shown by respective spectral diagrams in FIG. 1. The two bandpass filtered spectra $S_{bp1}(\mu, k)$ and $S_{bp2}(\mu, k)$ are combined (in the frequency or sub-band domain: added) to obtain a spectrum $S_{bp}(\mu, k)$, in which the fricative energy is expected to be high, according to:

$$S_{bp}(\mu,k)=S_{bp1}(\mu,k)+S_{bp2}(\mu,k). \qquad (3)$$

A fricative detection is performed by comparing in a short-term energy comparison procedure 104 the band-limited energy of the current frame to the band-limited energy of the previous frame. A segment may be classified as a fricative if the energy $|S_{bp}(\mu,k)|^2$ in all sub-bands of a frame k is greater than the energy $|S_{bp}(\mu,k-1)|^2$ in the previous frame k-1 according to:

Fricative, if $|S_{bp}(\mu,k)|^2 > |S_{bp}(\mu,k-1)|^2, \forall \mu \in N_{Sbb}$, Non-fricative, if otherwise. (4)

If this is not the case, the segment is classified as non-fricative. The frame size for such segments may be chosen to be between 50 ms and 250 ms. In speech enhancement systems, this type of detection may fail since the input signals are usually noisy and it is difficult up to impossible to distinguish between (stationary and non-stationary) background noise and fricatives in speech segments.

In order to detect fricative segments more reliably in noisy speech signals, the primary detection method described above may be modified and supplemented to increase its detection performance, referred to as "robustness" below. As mentioned, usually the input to a fricative detector is a noisy speech signal, which in the frequency domain is denoted herein by an input spectrum $Y(\mu, k)$. As described above in connection with FIG. 1, the input spectrum is bandpass filtered, so that in the present case the spectrum is obtained by replacing the clean speech spectrum $S(\mu, k)$ by the noisy speech spectrum $Y(\mu, k)$ in Equation (1) and Equation (2), which can be described by Equation (5) and Equation (6), respectively:

$$Y_{b1}(\mu,k)=Y(\mu,k)\cdot H_{bp1}(\mu,k), \qquad (5)$$

$$Y_{b2}(\mu,k)=Y(\mu,k)\cdot H_2(\mu,k), \qquad (6)$$

wherein $H_{bp1}(\mu, k)$ and $H_{bp2}(\mu, k)$ denote again the transfer functions employed in the two bandpass filtering procedures 101 and 102 shown in FIG. 1, and $Y_{b1}(\mu, k)$ and $Y_{b2}(\mu, k)$ denote two bandpass filtered spectra derived from the noisy input spectrum $Y(\mu, k)$ by filtering with transfer functions $H_{bp1}(\mu, k)$ and $H_{bp2}(\mu, k)$. The noisy input spectrum $Y(\mu, k)$ is the combination of the clean speech spectrum $S(\mu, k)$ and a background noise spectrum $B(\mu, k)$.

A first measure for improving the robustness of a noisy input spectrum is applying a maximum operation to the two bandpass filtered spectra $Y_{b1}(\mu, k)$ and $Y_{b2}(\mu, k)$. The spectral components of the two bandpass filtered spectra $Y_{b1}(\mu, k)$ and $Y_{b2}(\mu, k)$ may contain fricative energy in any of the sub-bands. Adding the two spectra would most likely result in an undesired deterioration of the signal-to-noise ratio. The maximum operation, in contrast, selects exactly those sub-bands from the magnitude of the two bandpass filtered spectra $Y_{b1}(\mu, k)$ and $Y_{b2}(\mu, k)$ which are greater compared to the other. In this way only the high energy sub-bands are selected for further processing. The maximum (argmax) operation outputs those sub-bands that contain the maximum energy compared to the corresponding sub-band of the respective other spectrum to obtain a maximum spectrum $Y_{bpm}(\mu, k)$ according to Equation (7):

$$Y_{bpm}(\mu,k)=\arg\max_\mu(\max|Y_{b1}(\mu,k)|,|Y_{b2}(\mu,k)|). \qquad (7)$$

Thus, the frequency range of maximum fricative energy is detected by either the bandpass filtering procedure 101 (e.g., between 2 kHz and 4 kHz) or bandpass filtering procedure 102 (e.g., between 4 kHz and 6 kHz), i.e., the frequency range that includes the maximum magnitude or (total) energy. Furthermore, only segments containing sufficient energy may be selected since the maximum operation can be applied per sub-band.

Detection of fricatives purely on the bandpass filtered spectrum may not be sufficient with varying background noise scenarios. To filter noisy speech signals in order to obtain (estimated) clean speech, different types of filtering may be applied such as normal (traditional) or modified Wiener Filtering or dynamic noise suppression.

The function of a noise reduction filter such as a Wiener filter is to suppress noise and thereby increase the signal-to-noise ratio (SNR) of the signal. Determining the signal-to-noise ratio of a signal includes magnitude squaring operations. From the definition of the signal-to-noise ratio it can be seen that, in order to increase the signal-to-noise ratio, it may be sufficient to process only the magnitude of the signal. In the frequency domain, a noise suppression filter that has a transfer function $H(e^{j\Omega})$, $e^{j\Omega}$ being a complex frequency, can be applied to obtain an estimate $\hat{S}(e^{j\Omega})$ of clean speech according to $$\hat{S}(e^{j\Omega})=H(e^{j\Omega})\cdot Y(e^{j\Omega}), \qquad (8)$$

wherein $Y(e^{j\Omega})$ represents the noisy input spectrum as input into the microphone, which can be described by $$Y(e^{j\Omega})=S(e^{j\Omega})+B(e^{j\Omega}). \qquad (9)$$

$S(e^{j\Omega})$ represents speech components contained in the microphone input and $B(e^{j\Omega})$ represents background noise components contained in the microphone input and output, i.e., noise to be suppressed. The situation can thus be seen as a single channel noise reduction issue. The filter with transfer function $H(e^{j\Omega})$, which is to suppress the background noise $B(e^{j\Omega})$, is dependent on the properties of the background noise $B(e^{j\Omega})$. If the background noise $B(e^{j\Omega})$ emerges at a certain fix frequency, then the filter may be designed to have an attenuation at this particular fix frequency (if known) to remove, e.g., artifacts generated by a power line at harmonics of the powerline frequency. This can be achieved, for example, by a fix filter.

Background noise in general, however, is different from, e.g., constant noise at a fixed frequency. Some background noise properties are statistical in nature and can best be described by their probability distributions, first moments, second moments, etc. Single channel speech enhancement may involve statistical filtering such as Wiener filtering for noise reduction of a noisy signal. Wiener filtering minimizes the expectation of the mean of a squared error signal. The error signal is the difference between the desired signal and the estimated desired signal. The Wiener solution can be extended to be applicable to noise reduction in speech applications. The Wiener solution or the optimal filter transfer function $H_{wiener}(e^{j\Omega})$ for noise reduction in terms of minimizing the mean squared error in the frequency domain is given by $$H_{wiener}(e^{j\Omega}) = \frac{S_{ss}(e^{j\Omega})}{S_{ss}(e^{j\Omega}) + S_{bb}(e^{j\Omega})}. \quad (10)$$

The term $S_{ss}(e^{j\Omega})$ represents the power spectral density (PSD) of the signal of interest and $S_{bb}(e^{j\Omega})$ represents the power spectral density of the background noise. Equation (10) describes the power spectral density of the signal of interest $S_{ss}(e^{j\Omega})$, which is not accessible. Assuming that the desired signal and the distortion are orthogonal, the noisy input spectrum can be described by equation (11):

$$S_{yy}(e^{j\Omega}) = S_{ss}(e^{j\Omega}) + S_{bb}(e^{j\Omega}). \quad (11)$$

Equation (10) is formulated in the frequency domain and can be rewritten in the sub-band domain, i.e., can be described according to equation (12):

$$H_{wiener}(\mu, k) = 1 - \frac{\hat{B}^2(\mu, k)}{|Y(\mu, k)|^2}. \quad (12)$$

The Wiener filter can thus be denoted by a sub-band domain transfer function $H_{wiener}(\mu, k)$ and can be seen as a sub-band attenuation filter dependent on the signal-to-noise ratio per sub-band it in frame k. $\hat{B}(\mu, k)$ denotes the estimated background noise spectrum and $Y(\mu, k)$ denotes the input spectrum. The normal Wiener filter, which is denoted in the sub-band domain by its transfer function $H_{wf}(\mu, k)$, suppresses noise as estimated by a background noise estimator according to:

$$H_{wf}(\mu, k) = \max\left\{1 - \frac{\Lambda_{0-est} \cdot \hat{B}^2(\mu, k)}{|Y_{bpm}(\mu, k)|^2}, H_{floor}\right\}. \quad (13)$$

wherein $\Lambda_{0-est}$ denotes a noise overestimation factor and $H_{floor}$ denotes a fix minimum for the filtering.

Several approaches exist for estimating the power spectral density of noise. For example, two noise estimation procedures are discussed herein, one of which is a basic noise PSD estimator and the other is an advanced noise power-spectral-density estimator which is based on a noisy signal model and a basic noise PSD estimator. According to the noisy signal model, noise and speech signals are modeled as mutually orthogonal random processes and the cross-terms become zero, hence their power spectral densities can be directly added as shown in Equation (14):

$$|Y(\mu,k)|^2 = |S(\mu,k)|^2 + |B(\mu,k)|^2. \quad (14)$$

The basic noise PSD estimator is based on a multiplicative time-constant-based approach and is operated to track and follow the smoothed noisy input magnitude spectrum in steps with fix constants. This procedure is performed based on the previous noise power estimates to compute the current noise power estimate. The approach is similar to the time-recursive approach but here only the previous noise estimate is used instead of using it in combination with the current input magnitude. Such a noise estimate can be described by:

$$\vec{B}_{basic}(\mu,k) = \Delta_{basic}(\mu,k) \cdot \hat{B}_{basic}(\mu,k-1) \quad (15)$$

wherein $\hat{B}_{basic}(\mu, k)$ is the estimate of the (background) noise spectrum for the current frame k, $\hat{B}_{basic}(\mu, k-1)$ is the estimate of the (background) noise spectrum for the previous frame k−1, and $\Delta_{basic}(\mu, k)$ is the time-frequency varying multiplicative constant which can be determined according to:

$$\Delta_{basic}(\mu, k) = \begin{cases} \Delta_{inc}, & \text{if } \overline{Y}(\mu, k) > \hat{B}_{basic}(\mu, k-1) \\ \Delta_{dec}, & \text{else.} \end{cases} \quad (16)$$

An increment multiplicative constant $\Delta_{inc}$ is selected as the time-frequency varying multiplicative constant $\Delta_{basic}(\mu, k)$ if the smoothed input error magnitude spectrum $\overline{Y}(\mu, k)$ is greater than the previous noise estimate, otherwise a decrement multiplicative constant $\Delta_{dec}$ is selected. The smoothed error magnitude spectrum $\overline{Y}(\mu, k)$ can be described by Equation (17) below.

Smoothing reduces the variance of the input error magnitude spectrum $\overline{Y}(\mu, k)$. Smoothing may be performed over time (frames) in every sub-band. The smoothing of the input error spectrum may be performed by a first order infinite impulse response (IIR) filter, which can be described as:

$$\overline{Y}(\mu,k) = a_y Y_{mag}(\mu,k) + (1-a_y)\overline{Y}(\mu,k-1). \quad (17)$$

wherein, $\alpha_y$ denotes a smoothing constant, $\overline{Y}(\mu, k-1)$ denotes a previous smoothed input error magnitude spectrum, and $Y_{mag}(\mu, k)$ is determined according to:

$$Y_{mag}(\mu,k) = |\Re\{Y(\mu,k)\}| + |\Im\{Y(\mu,k)\}|. \quad (18)$$

The tracking of the noise power estimator is dependent on the smoothed input magnitude spectrum, wherein $\Re$ denotes the real part and $\Im$ the imaginary part.

Compared to Wiener filtering, dynamic noise suppression is more aggressive in terms of noise suppression. Dynamic noise suppression is intended to shape the noise according to a target noise shape. Wiener type noise suppression filtering improves the signal-to-noise ratio of a noisy input signal, which is desirable for frames that contain speech signals. In frames that contain only (background) noise, Wiener filtering sometimes may not be desirable or provide insufficient noise suppression. Such drawbacks may be faced in practical situations in which, e.g., a communication device can be placed anywhere and everywhere to the effect that highly non-stationary noise cannot be tracked by noise PSD estimators. Further, highly non-stationary noise may be extremely annoying to a listener.

Generically speaking, noise shaping can be anything including, for example, applying a fix noise shape or a fix filtering to residual noise. In the context of noise reduction, system noise magnitude shaping may be performed in such a way that highly dynamic fluctuations and variations of the noisy input spectrum are controlled. One way to achieve this is to predefine the desired noise shape. By doing so, a suitable filter can be designed in such a way that the output of the noise magnitude shaping is equal to the desired noise shape. To achieve dynamic noise suppression it is necessary to determine the magnitude shape of the desired residual noise. Dynamic noise suppression may estimate the desired noise magnitude shape based on either the input magnitude spectrum or its smoothed version (see above Equation (18)). Because the noisy input spectrum is highly dynamic, a predefined and fix shape would result in an extremely "static" sounding residual noise. In order to make the residual noise sound more natural and pleasant to the listener, the desired noise shape may be estimated and "extracted" (e.g., filtered out) from the noisy input spectrum in a specific way. For example, a long-term estimate of the noisy input magnitude spectrum may be utilized as a desired shape of the residual noise. Such a long-term estimate can be obtained as described by Equations (19) and (20):

$$\Delta_{delta\text{-}shape}^{delta}(\mu, k) = \frac{Y_{des\text{-}shape}(\mu, k-1)}{\overline{Y}(\mu, k)} \quad (19)$$

wherein $\Delta_{delta\text{-}shape}^{delta}(\mu, k)$ denotes an incremental or decremental constant, and $Y_{des\text{-}shape}(\mu, k)$ denotes a desired noise magnitude shape, e.g., a slow multiplicative-constant based tracker, which can be described as follows:

$$Y_{des\text{-}shape}(\mu, k) \begin{cases} Y_{des\text{-}shape}(\mu, k-1) \cdot \Delta_{delta\text{-}shape}^{delta}(\mu, k), \\ \quad \text{if } \frac{Y_{des\text{-}shape}(\mu, k-1)}{\overline{Y}(\mu, k)} > 1.5 \text{ or} \\ \quad \frac{Y_{des\text{-}shape}(\mu, k-1)}{\overline{Y}(\mu, k)} < 0.5, \\ Y_{des\text{-}shape}(\mu, k-1), \text{ else.} \end{cases} \quad (20)$$

The desired noise magnitude shape $Y_{des\text{-}shaped}(\mu, k)$ is obtained by multiplying the previous estimate of the noise magnitude shape with the incremental or decremental constant $\Delta_{delta\text{-}shape}^{delta}(\mu, k)$. The distance of the current frame to the desired magnitude is computed with a threshold set at 1.5 and 0.5 which can be changed or adjusted. The algorithm also provides for a "hold time" during which the desired shape is not updated.

The dynamic noise suppression may utilize a multiplicity of (e.g., five) parameters that are tuned. These parameters influence the way the dynamic noise suppression behaves in different situations. As already discussed in connection with Equation (20), a desired magnitude may be determined based on the distance between the previous desired magnitude and the magnitudes of the current smoothed input spectrum. This procedure can be modified by replacing the incremental or decremental constant $\Delta_{delta\text{-}shape}^{delta}(\mu, k)$ by fix constants when the distance is larger than 1.5 or lesser than 0.5. These fix tracking constants can be set to a fix value (e.g., 1 dB/s) for the increment part and another fix value (e.g., −6 dB/s) for the decrement part.

Another tuning parameter may address spectral smoothing (smoothing over frequency) of the determined suppression factors by way of a smoothing constant $a_\gamma$, which may be tuned in such a way that the transition from one frame to the other is smoother for the far-end listener. The loudness of the suppressed signal may be controlled effectively by two over-estimation parameters $\Lambda_{dyn\text{-}supp}^{o\text{-}est}$ and $\Lambda_{dyn\text{-}shape}^{o\text{-}est}$, wherein the one estimation parameter $\Lambda_{dyn\text{-}shape}^{o\text{-}est}$ controls the broadband level of the desired magnitude and the other estimation parameter $\Lambda_{dyn\text{-}supp}^{o\text{-}est}$ controls the broadband level of the suppression factors. For practical tuning purposes, the parameter $\Lambda_{des\text{-}shape}^{o\text{-}est}$ is set to be a factor of the Wiener filter floor $H_{floor}$. Finally the two parameters which control the maximum and the minimum suppression applied by the dynamic noise suppression filter is controlled by maximum and minimum and suppression parameters $H_{dyn}^{max}$ and $H_{dyn}^{min}$. When the dynamic noise suppression filter is applied, the musical noise artifacts may be audible. This can be addressed by tuning the maximum and minimum suppression parameters $H_{dyn}^{max}$ and $H_{dyn}^{min}$.

A modified version of the dynamic suppression, represented by a transfer function $H_{dyf}(\mu, k)$, may be applied, which can be described as follows:

$$H_{dyf}(\mu,k) = \Lambda_{dyn\text{-}supp}^{o\text{-}est} \cdot \overline{Y}_{bmp\text{-}supp}(\mu,k) \quad (21)$$

wherein the smoothed suppression factors $\overline{Y}_{bmp\text{-}supp}(\mu, k)$ may be multiplied with a control parameter $\Lambda_{dyn\text{-}supp}^{o\text{-}est}$. The smoothed suppression factors $\overline{Y}_{bmp\text{-}supp}(\mu, k)$ may be determined as per Equation 22:

$$\overline{Y}_{bmp\text{-}supp}(\mu,k) = \alpha_{\overline{\gamma}} \cdot Y_{bmp\text{-}supp}(\mu,k) + (1-\alpha_{\overline{\gamma}}) \cdot \overline{Y}_{supp}(\mu-1,k). \quad (22)$$

With the suppression factors available, the final "dynamic" noise suppression filter, which has a transfer function $\hat{H}_{dyn}(\mu, k)$ is determined by simply shifting the computed suppression factors by the amount of desired suppression given by:

$$\hat{H}_{dyn}(\mu,k) = \Lambda_{dyn\text{-}supp}^{o\text{-}est} \cdot \overline{Y}_{supp}(\mu,k), \quad (23)$$

wherein the smoothed suppression factors may be supplemented again with a control parameter $\Lambda_{dyn\text{-}supp}^{o\text{-}est}$. This parameter is usually tuned based on the noise floor $H_{floor}$ to consider the amount of suppression applied in the dynamic suppression method. In order to control undesirable musical noise, the suppression filter may be limited to a maximum and a minimum value given by:

$$H_{dyn}(\mu,k) = \max(\min(\hat{H}_{dyn}(\mu,k), \hat{H}_{dyn}(\mu,k), H_{dyn}^{min}), H_{dyn}^{max}), \quad (24)$$

wherein the minimum and the maximum values are adjusted based during the tuning process.

As can be seen, the normal $H_{wf}(\mu, k)$ and the dynamic suppression filters $H_{dyf}(\mu, k)$ are combined in one closed equation:

$$H_{dwf}(\mu, k) = \begin{cases} H_{dyf}(\mu, k), & \text{if } \mu_{bp\text{-}low} > \mu \text{ or } \mu > \mu_{bp\text{-}high} \\ H_{wf}(\mu, k), & \text{else} \end{cases} \quad (25)$$

Figure 2:
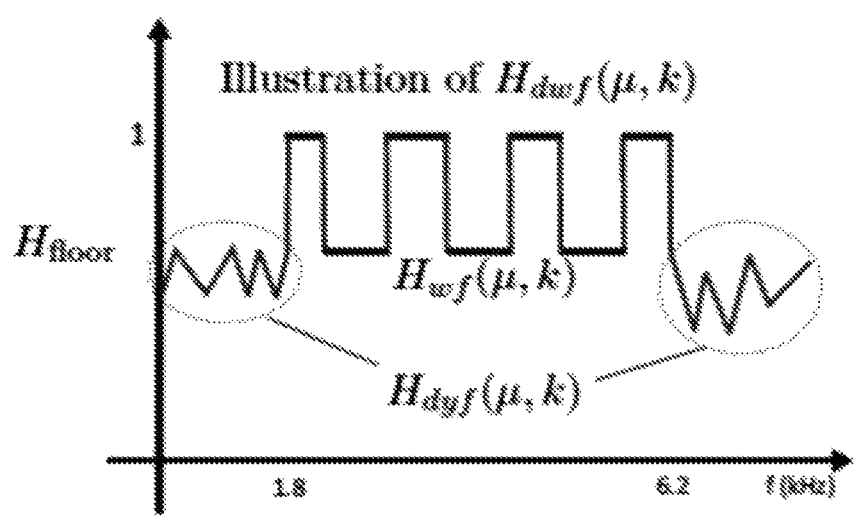
FIG. 2 is an amplitude-frequency diagram illustrating an example transfer function of an enhanced interframe fricative detection system for noisy speech signals.

A thus derived noise suppression filter has a transfer function $H_{dwf}(\mu, k)$ which is obtained by combining two noise suppression filters, e.g., a normal and a dynamic noise suppression filter, based on the frequency bin for which the transfer function $H_{dyf}(\mu, k)$ is outside a predefined frequency range between a lower frequency $\mu_{bp\text{-}low}$ and a higher frequency $\mu_{bp\text{-}high}$. The transfer function $H_{wf}(\mu, k)$ is chosen for the (bandpass) frequency range in which the fricative energy is expected. An example transfer function $H_{dwf}(\mu, k)$ is depicted in FIG. 2 by way of an amplitude-frequency diagram.

The filtering method described above allows for removing the background noise in the fricative range sufficiently without compromising the fricative energy at the same time. Signals at frequencies outside the range of the fricative energy are treated like noise. A transfer function (commonly also referred to as characteristic or characteristics) of such suppression filtering may be such as described by Equation (21). The determined transfer function $H_{dwf}(\mu, k)$ is then applied to the result of the maximum operation $Y_{bpm}(\mu, k)$ to obtain the spectrum which is exempted from out-of-band noise and also stationary and non-stationary background noise, represented herein by $\hat{S}_{bpf}(\mu, k)$. This can be described by Equation (26):

$$\hat{S}_{bpf}(\mu,k) = Y_{bpm}(\mu,k) \cdot H_{dwf}(\mu,k). \quad (26)$$

According to Equation (4), the energies of a current frame k and a previous frame k−1 are compared with each other. Comparing the energies of subsequent frames is one optional way of detection, another, more robust way is to employ in the comparison a parameter θ that identifies a past speech segment. Parameter θ is dependent on the "background noise" contained in the noisy speech signal. If the background noise is high at a particular frame, detection would fail in highly non-stationary noisy situations. Speech enhancement applications may vary significantly, as in automotive applications or in smart speaker applications placed in a noisy environment. Hence the parameter θ may be estimated in view of the current background noise situation. Further, a fricative jump ratio $F_{ratio}(k)$ may be determined based on a sum of non-stationary background noise $\hat{S}_{bpf}(\mu, k)$ per sub-band instead of the individual sub-bands according to:

$$F_{ratio}(k) = \frac{\sum_{\mu=0}^{N_{Sbb}} |\hat{S}_{bpf}(\mu, k)|}{\sum_{\mu=0}^{N_{Sbb}} |\hat{S}_{bpf}(\mu, k-\theta)|} \quad (27)$$

The fricative jump ratio $F_{ratio}(k)$ can be used to compare with a threshold for detection.

In order to make the detection more robust against background noise influences, the fricative jump ratio $F_{ratio}(k)$ may be bandlimited in the sub-band domain to a lower frequency $\mu_{fr\text{-}min}$ and an upper frequency $\mu_{fr\text{-}max}$. For example, the lower frequency $\mu_{fr\text{-}min}$ may be set to around 1500 Hz and the upper frequency $\mu_{fr\text{-}max}$ may be set to around 6000 Hz. Limiting the bandwidth allows for an earlier detection, a higher spectral signal-to-noise ratio (per sub-band) in the chosen frequency range and thus a higher detection probability, and more robustness in a wide range of noisy environments. A bandlimited fricative jump ratio $F_{ratio\text{-}bl}(k)$ can be described by $$F_{ratio\text{-}bl}(k) = \frac{\sum_{\mu_{fr\text{-}min}}^{\mu_{fr\text{-}max}} |\hat{S}_{bpf}(\mu, k)|}{\sum_{\mu_{fr\text{-}min}}^{\mu_{fr\text{-}max}} |\hat{S}_{bpf}(\mu, k-\theta)|} \quad (28)$$

Based on the above-described measures for increasing the robustness, fricative segments can more reliably be detected in a noisy speech signal by comparing the band-limited fricative jump ratio $F_{ratio\text{-}bl}(k)$ with a threshold given by Fricative, if $F_{ratio\text{-}bl}(k) > F_{thr}$, non-fricative, if otherwise. (29)

Fricatives in speech signals can be used as pre-detector to support other voice activity detection algorithms, e.g., utilized in noise reduction systems. As discussed above, in a method for detecting fricatives in noisy speech frames the primary method for fricative detection may be enhanced by at least one of three robustness enhancement measures.

Figure 3:
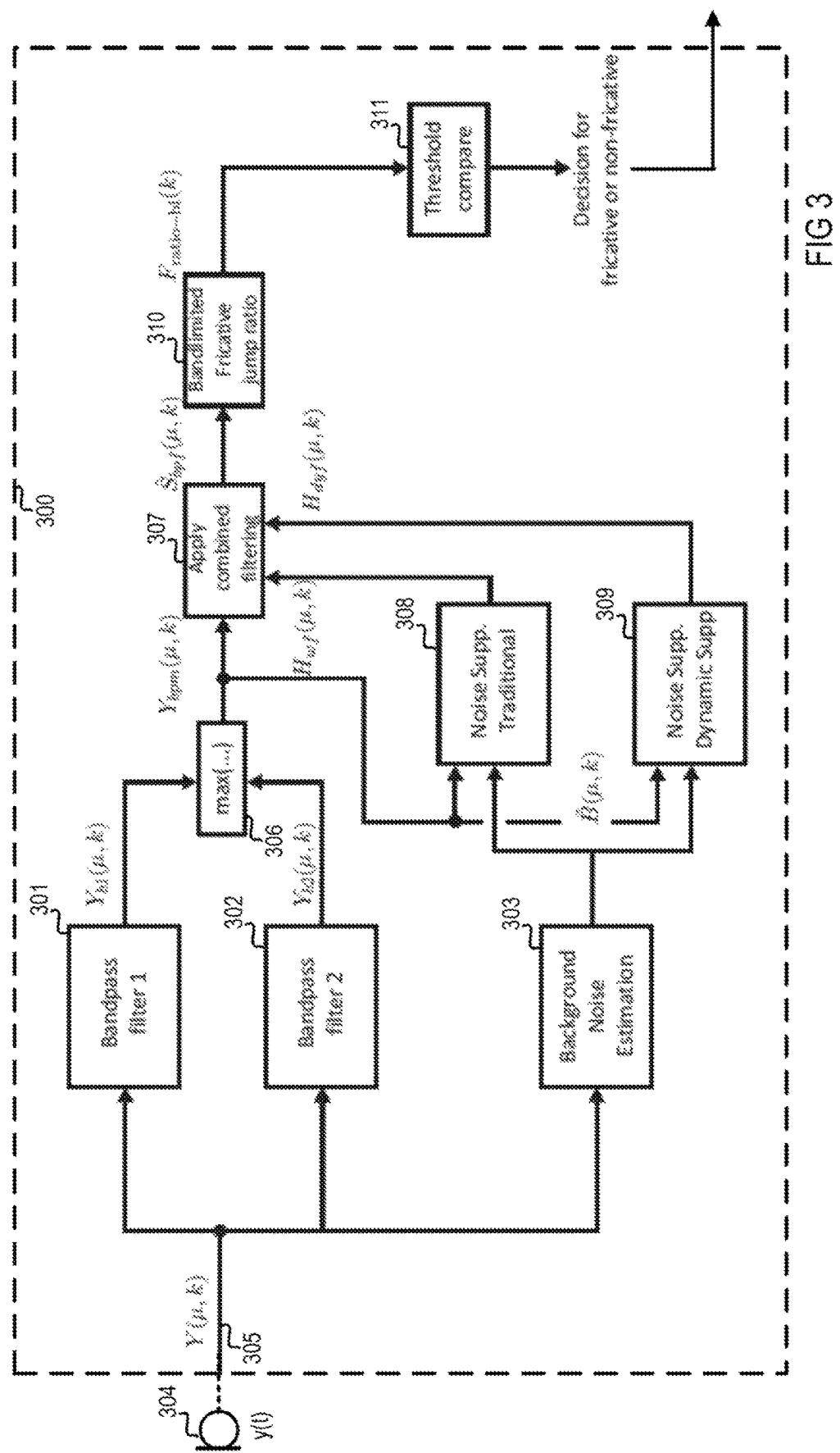
FIG. 3 is a block illustrating a signal flow structure of an exemplary enhanced interframe fricative detection system for noisy speech signals.

FIG. 3 is a block diagram illustrating a signal flow structure of an exemplary interframe fricative detection method for noisy speech signals, which is based on the method described in detail further above and which is implemented by way of program code executed by a processing unit 300 such as a controller, microprocessor, microcomputer or the like. A first bandpass filter 301, a second bandpass filter 302 and a background noise estimator 303 are implemented in the processor 300 and receive a time (t) domain noisy speech signal y(t) from, e.g., a microphone 304 via a signal path 305 that may include a multiplicity of signal processing blocks (not shown) such as an amplifier, one or more filters, an analog-to-digital converter, a time-to-frequency domain converter etc. The time domain noisy speech signal can also be described by its spectrum, which is herein referred to as input spectrum Y(μ, k).

By way of the two bandpass filters 301 and 302, which may be similar to or identical with the bandpass filters 101 and 102 described above in connection with FIG. 1, two partial spectra $Y_{b1}(\mu, k)$ and $Y_{b2}(\mu, k)$ are generated. The two partial spectra $Y_{b1}(\mu, k)$ and $Y_{b2}(\mu, k)$ are supplied to a maximum detector 306 that selects the maximum of the two partial spectra $Y_{b1}(\mu, k)$ and $Y_{b1}(\mu, k)$ to be provided as the spectrum $Y_{bpm}(\mu, k)$ to a combined filter 307, a first noise suppressor 308 and a second noise suppressor 309. The first noise suppressor 308 is operated in a manner that is described and referred to further above as "normal (type) noise suppression" and outputs a first suppressed spectrum, referred to above as spectrum $H_{w}(\mu, k)$. The second noise suppressor 309 is operated in a manner that is described and referred to further above as "dynamic (type) noise suppression" and outputs a second suppressed spectrum, referred to above as spectrum $H_{dy}(\mu, k)$. The first noise suppressor 308 and the second noise suppressor 309 further receive the estimated background noise spectrum $\hat{B}(\mu, k)$ provided by the background noise estimator 303. The combined filter 307 receives, beside the spectrum $Y_{bpm}(\mu, k)$ from the maximum detector 306, the spectra $H_{w}(\mu, k)$ and $H_{dy}(\mu, k)$ from the first noise suppressor 308 and the second noise suppressor 309, and provides the estimated clean speech spectrum $\hat{S}_{bpf}(\mu, k)$. A block 310 for generating a bandlimited fricative jump ratio receives the estimated clean speech spectrum $\hat{S}_{bpf}(\mu, k)$ and generates therefrom the ratio Fratio-bl(k), which is compared to a given threshold in a comparator 311 to decide whether a fricative is present or not. The result of the decision may be forwarded to a speech recognition system (not shown) or any other speech processing system. The operations conducted by the processor 300 may be in the time domain, frequency domain, sub-band domain and combinations thereof as appropriate.

Figure 4:
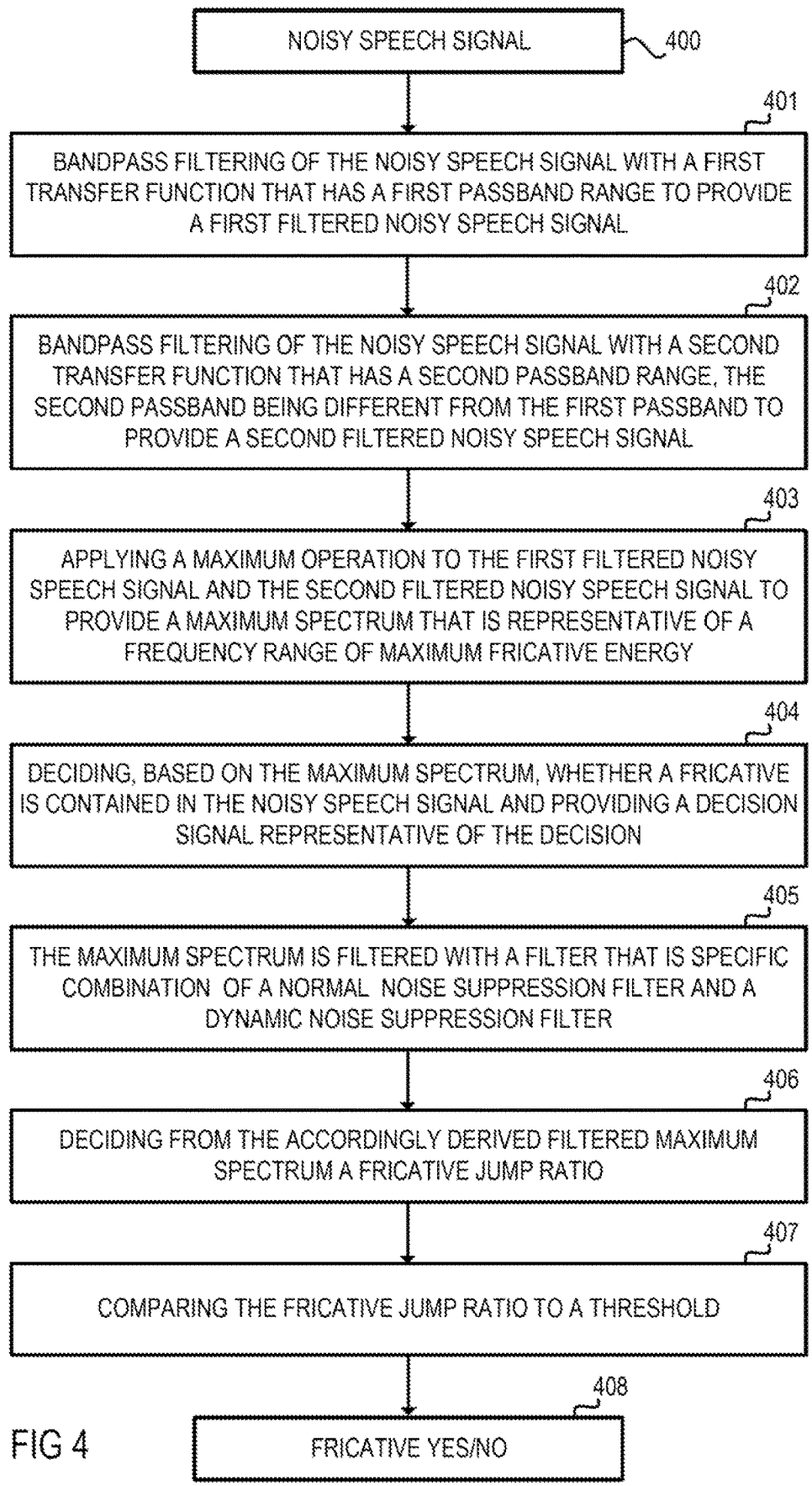
FIG. 4 is a flow chart illustrating an exemplary enhanced interframe fricative detection method for noisy speech signals.

FIG. 4 is a flow chart illustrating an exemplary enhanced interframe fricative detection method for noisy speech signals. The method for detecting fricatives in a noisy speech signal 400, which contains a clean speech signal and a noise signal, includes bandpass filtering of the noisy speech signal with a first transfer function having a first passband range to provide a first filtered noisy speech signal (procedure 401), and bandpass filtering of the noisy speech signal with a second transfer function having a second passband range, the second passband being different from the first passband to provide a second filtered noisy speech signal (procedure 402). The method further includes applying a maximum operation to the first filtered noisy speech signal and the second filtered noisy speech signal to provide a maximum spectrum that is representative of a frequency range of maximum fricative energy (procedure 403), and deciding, based on the maximum spectrum, whether a fricative is contained in the noisy speech signal (procedure 404). Optionally, the maximum spectrum is filtered with a filter that is specific combination of two noise reduction filters, e.g., a normal (traditional) noise suppression filter and a dynamic noise suppression filter as described further above (procedure 405). Optionally, from the accordingly derived filtered maximum spectrum a fricative jump ratio is determined as again described further above (procedure 406). The fricative jump ratio is compared to a threshold (procedure 407) to provide a decision signal 408 representative of the decision.

The method described above may be encoded in a computer-readable medium such as a CD ROM, disk, flash memory, RAM or ROM, an electromagnetic signal, or other machine-readable medium as instructions for execution by a processor. Alternatively or additionally, any type of logic may be utilized and may be implemented as analog or digital logic using hardware, such as one or more integrated circuits (including amplifiers, adders, delays, and filters), or one or more processors executing amplification, adding, delaying, and filtering instructions; or in software in an application programming interface (API) or in a Dynamic Link Library (DLL), functions available in a shared memory or defined as local or remote procedure calls; or as a combination of hardware and software.

The method may be implemented by software and/or firmware stored on or in a computer-readable medium, machine-readable medium, propagated-signal medium, and/or signal-bearing medium. The media may comprise any device that contains, stores, communicates, propagates, or transports executable instructions for use by or in connection with an instruction executable system, apparatus, or device. The machine-readable medium may selectively be, but is not limited to, an electronic, magnetic, optical, electromagnetic, or infrared signal or a semiconductor system, apparatus, device, or propagation medium. A non-exhaustive list of examples of a machine-readable medium includes: a magnetic or optical disk, a volatile memory such as a Random Access Memory "RAM," a Read-Only Memory "ROM." an Erasable Programmable Read-Only Memory (i.e., EPROM) or Flash memory, or an optical fiber. A machine-readable medium may also include a tangible medium upon which executable instructions are printed, as the logic may be electronically stored as an image or in another format (e.g., through an optical scan), then compiled, and/or interpreted or otherwise processed. The processed medium may then be stored in a computer and/or machine memory.

The systems may include additional or different logic and may be implemented in many different ways. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

The invention claimed is:

1. A method for detecting fricatives in a noisy speech signal having a clean speech signal and a noise signal, the method comprising:
bandpass filtering of the noisy speech signal with a first transfer function having a first passband range to provide a first filtered noisy speech signal;
bandpass filtering of the noisy speech signal with a second transfer function having a second passband range, the second passband range being different from the first passband range to provide a second filtered noisy speech signal;
applying a maximum operation to the first filtered noisy speech signal and the second filtered noisy speech signal to provide a maximum spectrum that is representative of a frequency range of maximum fricative energy;
estimating background noise to provide an estimated spectrum of the background noise;
estimating a spectrum of the clean speech signal contained in the noisy speech signal by filtering out the noise contained in the maximum spectrum with a noise suppression transfer function, the noise suppression transfer function is selected from two different primary noise suppression transfer functions that are determined based on the estimated spectrum of the background noise, selection of the noise suppression transfer function being dependent upon whether a frequency of the estimated spectrum of the back ground noise is within or outside of a predefined frequency range, one of the primary noise suppression transfer functions is selected for a frequency range in which fricative energy is expected, and otherwise the other primary noise suppression transfer function is selected;
deciding, based on the maximum spectrum, whether a fricative is contained in the noisy speech signal; and
outputting a decision signal representative of the decision.

2. The method of claim 1, wherein one of the primary noise suppression transfer functions is a Wiener filter transfer function.

3. The method of claim 2, wherein another one of the primary noise suppression transfer functions is a Wiener filter transfer function in which the background noise is weighted with an overestimation weight.

4. The method of claim 1, wherein a fricative jump ratio is determined based on a sum of non-stationary background noise per sub-band contained in an estimated clean speech spectrum, and deciding whether a fricative is present or not is made by comparing the fricative jump ratio to a predetermined threshold.

5. The method of claim 4, wherein the fricative jump ratio is spectrally bandlimited.

6. The method of claim 4, wherein the fricative jump ratio is determined based on a parameter representative of a past speech segment.

7. A system for detecting fricatives in a noisy speech signal having a clean speech signal and a noise signal, the system has at least one processing unit connected to an input and an output, the system comprising:
   the at least one processing unit is configured to apply a first bandpass filter having a first transfer function with a first passband range to the noisy speech signal to provide a first filtered noisy speech signal;
   the at least one processing unit is configured to apply a second bandpass filter having a second transfer function with a second passband range to the noisy speech signal, the second passband range being different from the first passband range to provide a second filtered noisy speech signal;
   the at least one processing unit is configured to apply a maximum operation to the first filtered noisy speech signal and the second filtered noisy speech signal to provide a maximum spectrum that is representative of a frequency range of maximum fricative energy;
   the at least one processing unit is configured to estimate an estimated spectrum of background noise;
   the at least one processing unit is configured to select a noise suppression transfer function from two different primary noise suppression transfer functions that are determined based on the estimated spectrum of the background noise, the selection of the noise suppression transfer function is dependent upon whether the frequency of the estimated spectrum of the background noise is within or outside of a predefined frequency range;
   the at least one processing unit is configured to estimate an estimated spectrum of a clean speech signal contained in the noisy speech signal, the estimated spectrum of the clean speech signal is based on the estimated spectrum of the background noise;
   the at least one processing unit is configured to decide, based on the maximum spectrum, whether a fricative is contained in the noisy speech signal; and
   the at least one processing unit is configured to generate a decision signal output as representative of the decision.

8. The system of claim 7, wherein one of the primary noise suppression transfer functions is a Wiener filter transfer function.

9. The system of claim 8, wherein another one of the primary noise suppression transfer functions is a Wiener filter transfer function in which the background noise is weighted with an overestimation weight.

10. The system of claim 7, further comprising the at least one processing unit is configured to determine a fricative jump ratio based on a sum of non-stationary background noise per sub-band contained in the estimated spectrum of the clean speech signal, and the decision whether a fricative is present or not is made by comparing the fricative jump ratio to a predetermined threshold.

11. The system of claim 10, wherein the fricative jump ratio is spectrally bandlimited.

12. The system of claim 10, wherein the fricative jump ratio is based on a parameter representative of a past speech segment.

* * * * *